(12) United States Patent
Hou et al.

(10) Patent No.: US 10,542,415 B2
(45) Date of Patent: Jan. 21, 2020

(54) DATA TRANSMISSION METHOD FOR EDGE MULTIMEDIA BROADCAST/MULTICAST SERVICE (MBMS) SERVICE AND RELATED DEVICE

(71) Applicant: HUAWEI TECHNOLOGIES CO., LTD., Shenzhen (CN)

(72) Inventors: Yihe Hou, Shenzhen (CN); Yan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/876,731

(22) Filed: Jan. 22, 2018

(65) Prior Publication Data

US 2018/0146362 A1 May 24, 2018

Related U.S. Application Data

(63) Continuation of application No. PCT/CN2016/085163, filed on Jun. 7, 2016.

(30) Foreign Application Priority Data

Jul. 28, 2015 (CN) .......................... 2015 1 0451451

(51) Int. Cl.
*H04W 72/04* (2009.01)
*H04W 8/08* (2009.01)
(Continued)

(52) U.S. Cl.
CPC ............... *H04W 8/08* (2013.01); *H04W 4/06* (2013.01); *H04W 48/10* (2013.01); *H04W 72/005* (2013.01); *H04W 72/0406* (2013.01)

(58) Field of Classification Search
CPC . H04W 8/08; H04W 72/005; H04W 72/0406; H04W 48/10; H04W 4/06
See application file for complete search history.

(56) References Cited

U.S. PATENT DOCUMENTS

2004/0180675 A1 9/2004 Choi et al.
2007/0086443 A1 4/2007 Zhang et al.
(Continued)

FOREIGN PATENT DOCUMENTS

CN 102395110 A 3/2012
CN 102917311 A 2/2013
(Continued)

OTHER PUBLICATIONS

3GPP, Interworking between the Public Land Mobile Network (PLMN) supporting packet based services and Packet Data Networks (PDN), Oct. 2011, TS 29.061 V9.7.0, Sections 17.5.2 and 20.4.1 (Year: 2011).*

(Continued)

*Primary Examiner* — Hassan Kizou
*Assistant Examiner* — Mahbubul Bar Chowdhury
(74) *Attorney, Agent, or Firm* — Leydig, Voit & Mayer, Ltd.

(57) ABSTRACT

The present disclosure discloses a data transmission method for an edge MBMS service and a related device. The method includes providing an MBMS service data transmission system that includes a central BM-SC located on a core network and an edge BM-SC and an MBMS GW that are located on a network edge; creating, by the central BM-SC, a control-plane bearer context; sending a session start request to the edge BM-SC, so that the edge BM-SC creates a user-plane bearer context; receiving a session start response sent by the edge BM-SC; and delivering a service key to the edge BM-SC, so that the edge BM-SC encrypts data of the edge MBMS service by using the service key and sends data to UE via the MBMS GW.

14 Claims, 9 Drawing Sheets

(51) Int. Cl.
*H04W 4/06* (2009.01)
*H04W 48/10* (2009.01)
*H04W 72/00* (2009.01)

(56) References Cited

U.S. PATENT DOCUMENTS

| | | | | |
|---|---|---|---|---|
| 2008/0287057 | A1* | 11/2008 | Zisimopoulos | H04W 72/005 455/3.01 |
| 2010/0265867 | A1* | 10/2010 | Becker | H04W 72/005 370/312 |
| 2013/0279395 | A1* | 10/2013 | Aramoto | H04W 76/32 370/312 |
| 2014/0177437 | A1 | 6/2014 | Korus et al. | |
| 2015/0365819 | A1 | 12/2015 | Zhu et al. | |
| 2016/0057766 | A1* | 2/2016 | Linden | H04W 72/1263 370/329 |
| 2016/0072665 | A1* | 3/2016 | Xia | H04L 41/0659 370/225 |
| 2016/0119157 | A1* | 4/2016 | Hua | H04L 61/2069 370/312 |
| 2018/0034861 | A1 | 2/2018 | Gu et al. | |

FOREIGN PATENT DOCUMENTS

| | | |
|---|---|---|
| CN | 103430516 A | 12/2013 |
| CN | 103609147 A | 2/2014 |
| CN | 105163285 A | 12/2015 |
| RU | 2262811 C2 | 10/2005 |
| RU | 2373664 C2 | 11/2009 |
| WO | 2009045006 A1 | 4/2009 |
| WO | 2013022216 A1 | 2/2013 |
| WO | 2014099298 A1 | 6/2014 |

OTHER PUBLICATIONS

International Search Report and Written Opinion (including English translation) issued in corresponding International Application No. PCT/CN2016/085163, dated Aug. 26, 2016, 21 pages.

"MBMS security," 3GPP TSG SA WG3 Security—S3#23, S3-020363, 3rd Generation Generation Partnership Project, Valbonne, France (Jul. 2002).

* cited by examiner

DATA TRANSMISSION METHOD FOR EDGE MULTIMEDIA BROADCAST/MULTICAST SERVICE (MBMS) SERVICE AND RELATED DEVICE

CROSS-REFERENCE TO RELATED APPLICATIONS

This application is a continuation of International Application No. PCT/CN2016/085163, filed on Jun. 7, 2016, which claims priority to Chinese Patent Application No. 201510451451.1, filed on Jul. 28, 2015. The disclosures of the aforementioned applications are hereby incorporated by reference in their entireties.

TECHNICAL FIELD

The present disclosure relates to the field of communications technologies, and specifically, to a data transmission method for an edge multimedia broadcast/multicast service (MBMS) service and a related device.

BACKGROUND

A mobile Internet service is based on an over the top (OTT) mode and service data may come from a network, and a mobile network plays a role of a service data pipeline and is responsible for data connection between a terminal and the network

SUMMARY

The present disclosure provides data transmission methods and a communications system for an edge multimedia broadcast/multicast service (MBMS).

According to a first aspect, a data transmission method for an edge multimedia broadcast/multicast service (MBMS) service is provided. The method may be applied to a system including a central broadcast/multicast service center (BM-SC) located on a core network and an edge BM-SC and an MBMS gateway (GW) user-plane functional entity that are located on a network edge.

The method may include allocating, by the central BM-SC, a temporary mobile group identity (TMGI) to the edge MBMS service; creating, by the central BM-SC, a control-plane bearer context for the edge MBMS service, where the control-plane bearer context includes the TMGI; sending, by the central BM-SC, a session start request to the edge BM-SC, where the session start request is used for requesting creation of a user-plane bearer context for the edge MBMS service, where the session start request includes the TMGI; receiving, by the central BM-SC, a session start response from the edge BM-SC, where the session start response includes the TMGI; and delivering, by the central BM-SC, a service key to the edge BM-SC in responsive to the session start response, where the service key is used for encryption of data of the edge MBMS service.

According to a second aspect, a data transmission method for an edge multimedia broadcast/multicast service (MBMS) service is provided. The method may be applied to a system including a central broadcast/multicast service center (BM-SC) and an MBMS gateway (GW) control-plane functional entity that are located on a core network and an edge BM-SC and an MBMS GW user-plane functional entity that are located on a network edge, the MBMS GW user-plane functional entity is corresponding to the MBMS GW control-plane functional entity.

The method may include receiving, by the edge BM-SC, a session start request from the central BM-SC, where the session start request includes a temporary mobile group identity (TMGI) of the edge MBMS service; creating, by the edge BM-SC, a user-plane bearer context for the edge MBMS service in responsive to the session start request; sending, by the edge BM-SC, the session start request to the MBMS GW control-plane functional entity, where the session start request is used for requesting allocation of an Internet Protocol (IP) multicast address and creation of a control-plane bearer context for the edge MBMS service; receiving, by the edge BM-SC, a session start response from the MBMS GW control-plane functional entity, where the session start response includes the TMGI; sending, by the edge BM-SC, the session start response to the central BM-SC; receiving, by the edge BM-SC, a service key delivered by the central BM-SC; and encrypting, by the edge BM-SC, data of the edge MBMS service by using the service key, and sending encrypted data of the edge MBMS service to a user equipment (UE) via the MBMS GW user-plane functional entity.

According to a third aspect, a communications system for an edge multimedia broadcast/multicast service (MBMS) is provided. The system may include a central broadcast/multicast service center (BM-SC) located on a core network, where the central BM-SC is configured to: allocate a temporary mobile group identity (TMGI) to the edge MBMS; create a control-plane bearer context for the edge MBMS service, where the control-plane bearer context includes the TMGI; transmit a session start request including the TMGI; and generate a service key; and an edge BM-SC located on a network edge, communicatively coupled to the central BM-SC, where the edge BM-SC is configured to: receive the session start request from the central BM-SC; in responsive to the session start request, create a user-plane bearer context for the edge MBMS; receive the service key delivered by the central BM-SC; encrypt data of the edge MBMS by using the service key; and transmit encrypted data of the edge MBMS to a user equipment (UE).

It should be understood that general descriptions above and detailed descriptions below are merely illustrative and explanatory without limiting the present disclosure.

BRIEF DESCRIPTION OF DRAWINGS

To describe the technical solutions in the examples of the present disclosure more clearly, the following briefly describes the accompanying drawings required for describing the examples. Apparently, the accompanying drawings in the following description show merely some examples of the present disclosure, and a person skilled in the art may still derive other drawings from these accompanying drawings.

DETAILED DESCRIPTION

The following clearly describes the technical solutions in the examples of the present disclosure with reference to the accompanying drawings in the examples of the present disclosure. Apparently, the described examples are merely some but not all of the examples of the present disclosure. All other examples obtained by a person skilled in the art based on the examples of the present disclosure shall fall within the protection scope of the present disclosure.

With development of distributed cloud computing technologies, a mobile network edge is capable of providing a cloud computing service. In this context, a low-latency feature of an edge multimedia service is to bring users brand new Internet use experience. In addition, a future 5th generation mobile communications network is a network that implements the Internet of everything, and the Internet of Vehicles and the Internet of Things are important subnetwork types of the 5th generation mobile communications network. A one-to-many communication mode required in some application scenarios on these new networks (for example, broadcasting a message in a cooperative driving application on the Internet of Vehicles) has a low-latency requirement and a localization feature.

An enhanced MBMS (eMBMS) is an important means used to provide a multimedia service on a Long Term Evolution (LTE) network/an evolved packet core (EPC), and is an effective approach to improve utilization efficiency of wireless bandwidth and core network bandwidth. As to a network architecture, based on an existing architecture of a core network, key network elements, such as a broadcast/multicast service center (BM-SC) and a MBMS gateway (MBMS GW) are brought in for the eMBMS. In a network environment in which an evolved universal mobile telecommunications system terrestrial radio access network (E-UTRAN) acts as an access network, the BM-SC is an entry and an initiation point of MBMS service content. Main functions of the BM-SC include performing authorization and accounting on a content provider, making an MBMS service announcement and initiating an MBMS service for the content provider, sending MBMS content to the content provider, and the like. The MBMS GW is responsible for managing Internet Protocol (IP) multicast, forwarding control-plane signaling, forwarding service data, and the like, and the MBMS GW is formed by a control plane and a user plane. The BM-SC and the MBMS GW are generally deployed on the core network.

Figure 1:
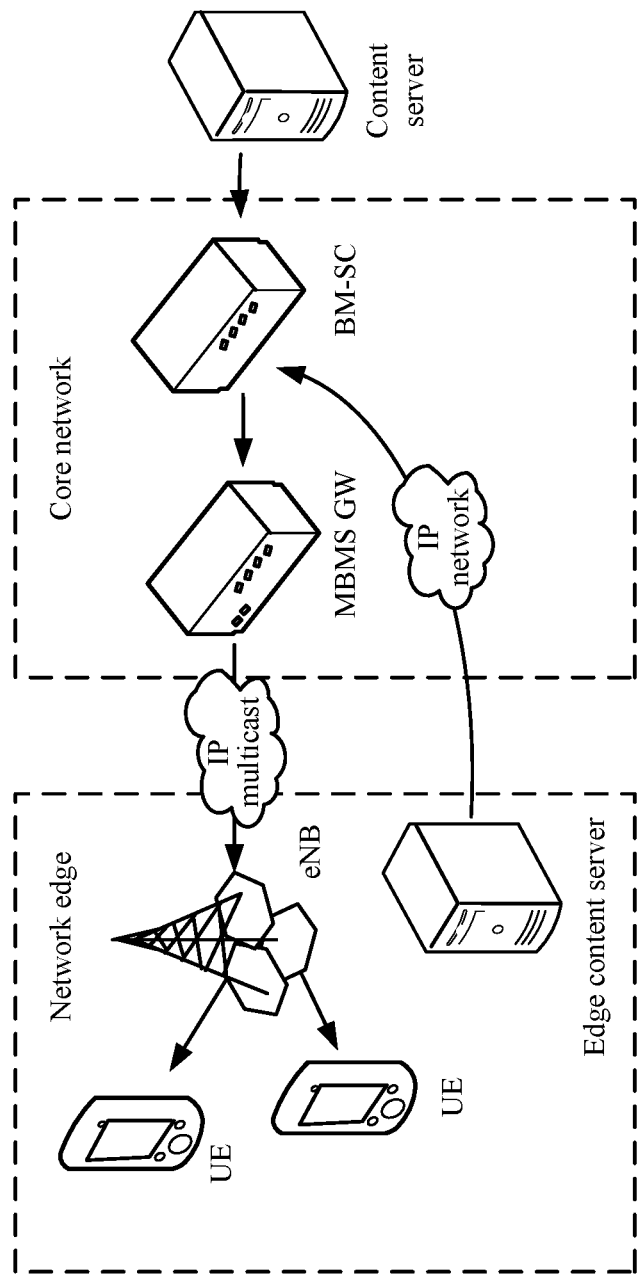
FIG. 1 is a schematic diagram of an example of an MBMS service data transmission system.

For edge MBMS service data (the data comes from the local), as shown in FIG. 1, a implementation solution is as follows: First, an edge content server accesses a mobile operator network by using an IP network and inputs service data into a BM-SC on a core network. Then, the BM-SC initiates creation of a service bearer resource. Afterwards, the BM-SC sends a service data flow to an MBMS GW on the core network, and the MBMS GW transfers, in an IP multicast manner, the service data to an edge evolved NodeB (eNB). Finally, the eNB sends the service data to a user equipment (UE) in a broadcast manner. It can be learned from the foregoing description that when the example described in FIG. 1 is used to transmit the edge MBMS service data, because both the BM-SC and the MBMS GW are deployed on the core network, a forwarding plane of the edge MBMS service data needs to be extended from the local (a network edge) to the core network, and then from the core network back to the local. Detour of the forwarding plane leads to two disadvantages: On the one hand, detour of a data plane increases a service data transmission latency, and consequently, requirements for some real-time edge multimedia broadcast services cannot be met. On the other hand, the detour of the data plane causes a waste of core network bandwidth, and consequently, when a large quantity of edge multimedia broadcast services are deployed, the core network bandwidth is inevitably subject to a relatively high pressure.

Figure 2:
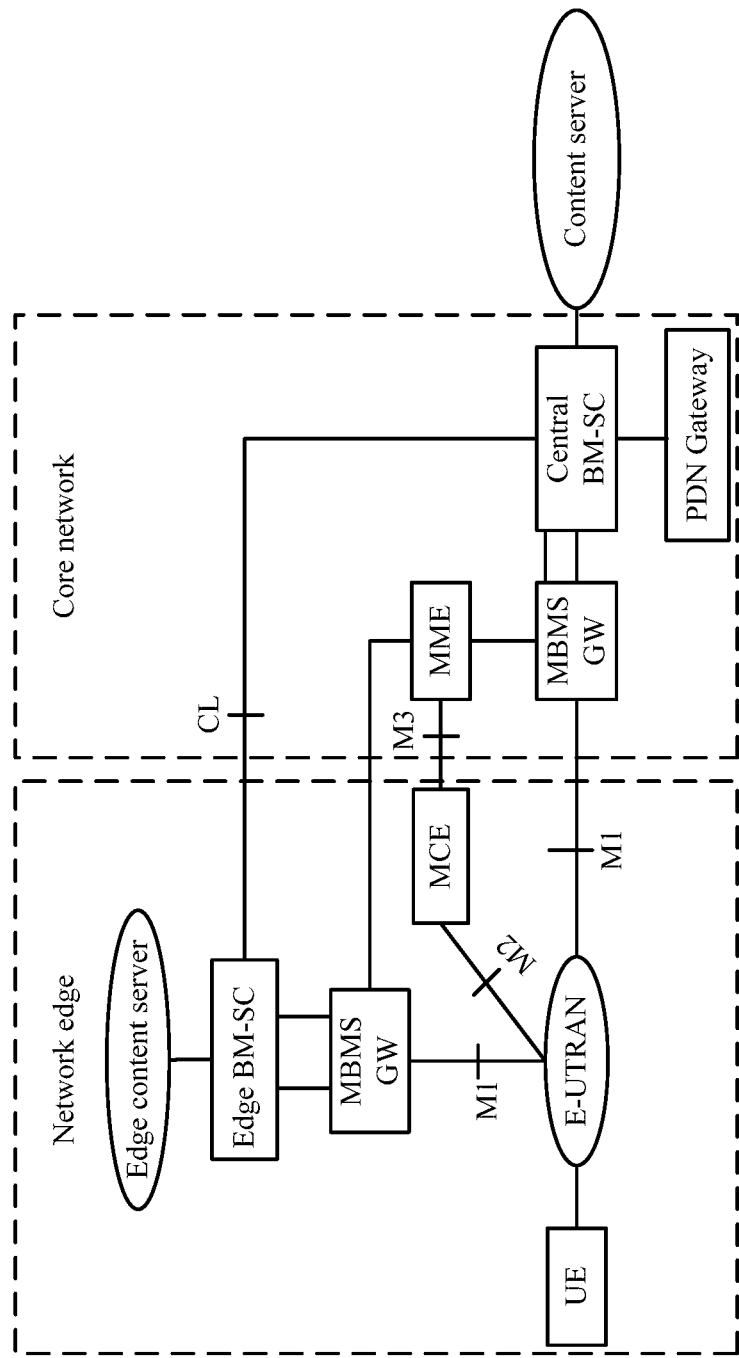
FIG. 2 is a schematic diagram of an MBMS service data transmission system according to an example of the present disclosure.

Before a data transmission method for an edge MBMS service that is provided in the present disclosure is described, a system architecture of the present disclosure is described first. Because a control-plane function and a user-plane function of an MBMS GW may be implemented on a same network entity (that is, the network entity has both the control-plane function and the user-plane function of the MBMS GW) or may be implemented on different network entities (that is, the control-plane function of the MBMS GW is implemented on a network entity, and the user-plane function of the MBMS GW is implemented on another network entity), an architecture of an MBMS service data transmission system provided in the present disclosure may be in two forms, and this example first describes a system architecture in which the control-plane function and the user-plane function of the MBMS GW are implemented on a same network entity. Referring to FIG. 2, in an MBMS service data transmission system in this example, an edge BM-SC and an MBMS GW are deployed on a network edge, and a central BM-SC is deployed on a core network. In addition, an edge content server and an MCE are further deployed on the network edge, UE is located on the network edge, and an MBMS GW, an MME, and the like are further deployed on the core network. The MBMS GW deployed on the network edge is the same as the MBMS GW deployed on the core network, and both MBMS GWs are capable of implementing the control-plane function and the user-plane function. It may be understood that the edge BM-SC implements mainly a user-plane function of a BM-SC. When data of a MBMS service is transmitted, it may be understood that the central BM-SC implements all functions (that is, the user-plane function and a control-plane function) of the BM-SC. When data of an edge MBMS service is transmitted, it may be understood that the central BM-SC implements only the control-plane function of the BM-SC. The edge BM-SC and the central BM-SC may perform signaling and information exchange by adding an interface CL. The edge BM-SC and the MBMS GW located on the network edge may perform signaling and information exchange by using original SGi-mb and SGmb interfaces. In addition, for a signaling and information exchange interface between other network elements, reference may be made to provisions in an existing standard, and details are not described herein. That is, in comparison with an MBMS service data transmission system, in the MBMS service data transmission system shown in FIG. 2, the edge BM-SC and the MBMS GW are added on the network edge.

Figure 3:
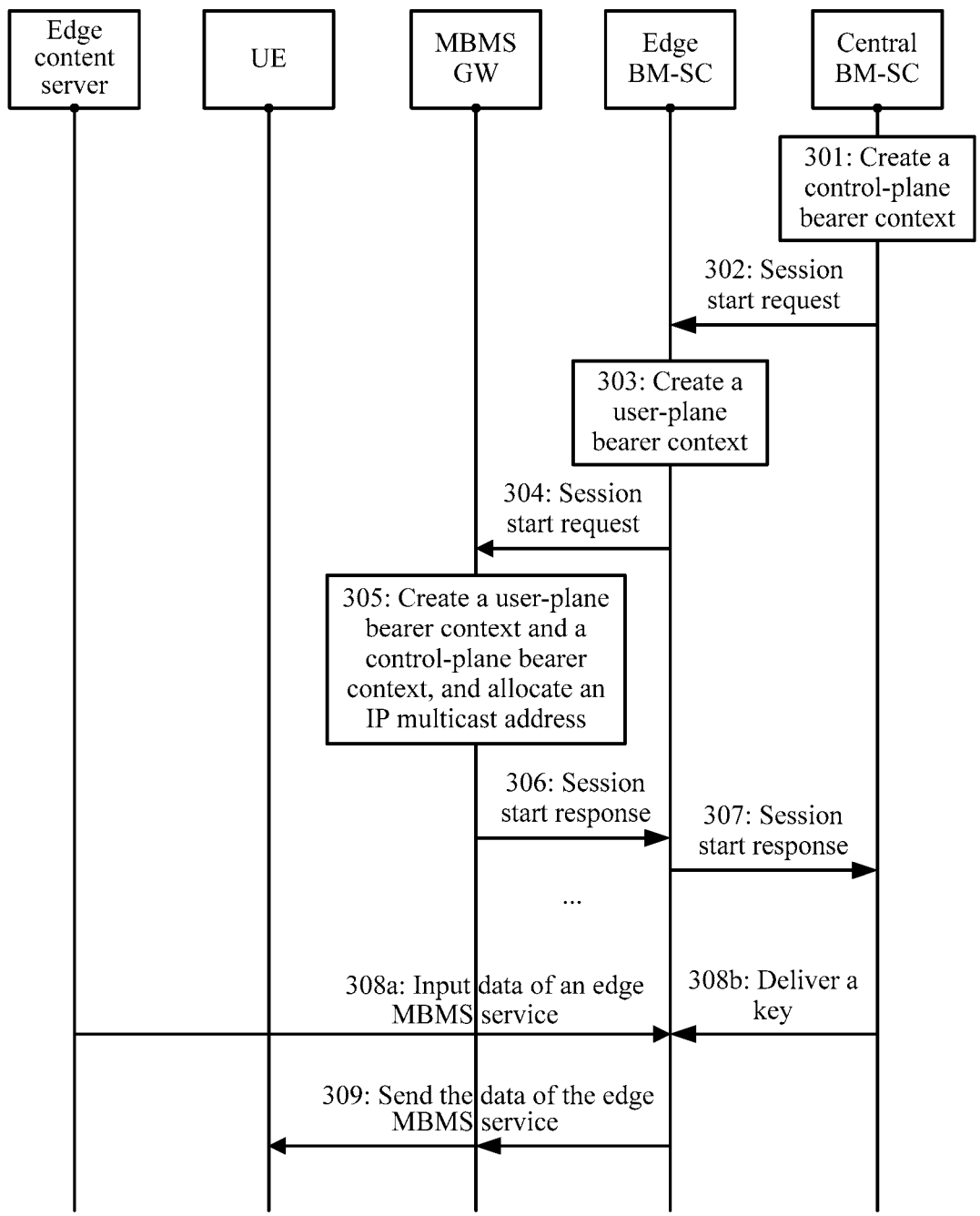
FIG. 3 is a schematic diagram of a session initiation procedure of edge MBMS service data transmission according to an example of the present disclosure.
Figure 4:
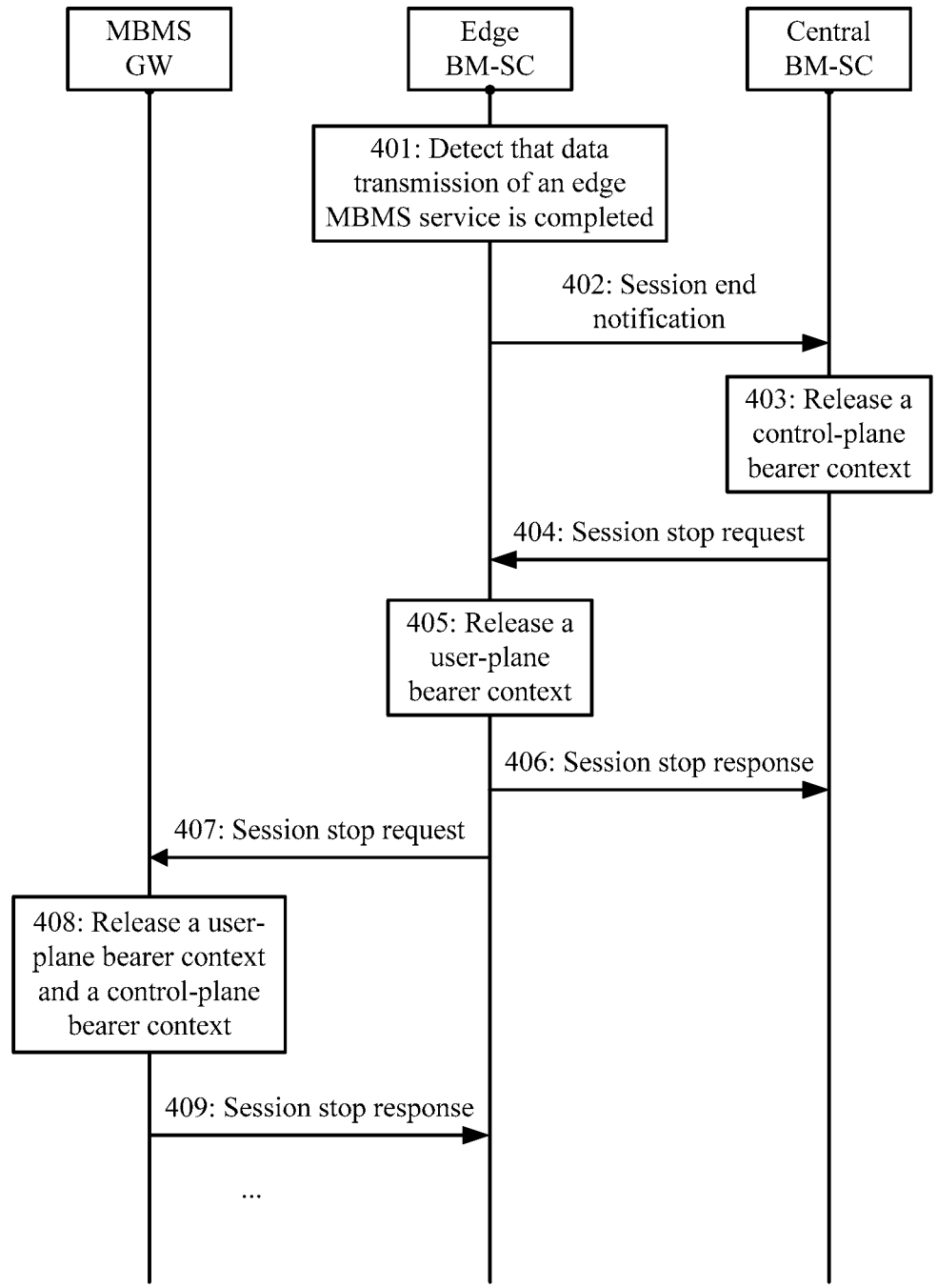
FIG. 4 is a schematic diagram of a session termination procedure of edge MBMS service data transmission according to an example of the present disclosure.

In a system architecture shown in FIG. 2, a transmission path of the data (provided by the edge content server) of the edge MBMS service is as follows: edge BM-SC->MBMS GW located on the network edge->E-UTRAN->UE, and a transmission path of the data (provided by a content server) of the MBMS service is as follows: central BM-SC->MBMS GW located on the core network->E-UTRAN->UE. In the system architecture shown in FIG. 2, for a specific data transmission procedure of the MBMS service, reference may be made to FIG. 1, and details are not described herein. The following example describes mainly a data transmission procedure of the edge MBMS service. Refer to FIG. 3 and FIG. 4. FIG. 3 is a schematic diagram of a session initiation procedure in an edge MBMS service data transmission process according to an example. FIG. 4 is a schematic diagram of a session termination procedure in an edge MBMS service data transmission process according to an example.

Referring to FIG. 3, an MBMS GW in FIG. 3 is located on a network edge, and the session initiation procedure includes the following steps.

Step 301: A central BM-SC creates a control-plane bearer context for an edge MBMS service.

The control-plane bearer context includes a temporary mobile group identity (TMGI) that is allocated to the edge MBMS service by the central BM-SC. In addition, the control-plane bearer context may further include information such as quality of service (QoS), a service area, a session identifier, an address of an edge BM-SC, and a downlink node list. A downlink node is, for example, the MBMS GW on the network edge or a mobility management entity (MME) on the network edge.

Step 302: The central BM-SC sends a session start request to an edge BM-SC.

The session start request includes the TMGI of the edge MBMS service. In addition, the session start request herein may further include an address of the MBMS GW on the network edge, the downlink node list, the service area, a service identifier, the QoS, and the like.

Step 303: The edge BM-SC creates a user-plane bearer context for the edge MBMS service.

Step 304: The edge BM-SC sends a session start request to the MBMS GW.

The session start request herein includes the TMGI, the QoS, the service area, the service identifier, an address of a downlink node MME, and the like.

Step 305: The MBMS GW allocates an IP multicast address, and creates a control-plane bearer context and a user-plane bearer context for the edge MBMS service.

The IP multicast address is used when the MBMS GW interacts with an eNB. The MBMS GW may further allocate a control-tunnel endpoint identifier (C-TEID), and the C-TEID is used when the MBMS GW interacts with the MME.

Step 306: The MBMS GW sends a session start response to the edge BM-SC.

The session start response carries the TMGI of the edge MBMS service.

Step 307: The edge BM-SC sends a session start response to the central BM-SC.

Between step 307 and step 308a, another step may be further included. For example, the MBMS GW sends a session start request to a downstream MME, the MME creates a bearer context, and the MME sends a session start request to another downstream node. Details are not described herein. For details, reference may be made to an existing eMBMS standard procedure.

Step 308a: An edge content server inputs data of the edge MBMS service into the edge BM-SC.

Step 308b: The central BM-SC delivers a service key to the edge BM-SC.

Step 309: The edge BM-SC sends the data of the edge MBMS service to a UE via the MBMS GW.

The edge BM-SC encrypts the data of the edge MBMS service by using the service key delivered by the central BM-SC and sends encrypted data of the edge MBMS service to the MBMS GW. The MBMS GW sends, by using an E-UTRAN, the encrypted data to the UE according to the previously allocated IP multicast address.

Referring to FIG. 4, the session termination procedure includes the following steps.

Step 401: An edge BM-SC detects that data transmission of an edge MBMS service is completed.

Step 402: The edge BM-SC sends a session end notification to a central BM-SC.

The session end notification carries a TMGI of the edge MBMS service.

Step 403: The central BM-SC releases a control-plane bearer context.

Step 404: The central BM-SC sends a session stop request to the edge BM-SC.

The session stop request carries the TMGI of the edge MBMS service.

Step 405: The edge BM-SC releases a user-plane bearer context.

Step 406: The edge BM-SC sends a session stop response to the central BM-SC.

The session stop response carries the TMGI of the edge MBMS service.

Step 407: The edge BM-SC sends a session stop request to an MBMS GW.

Step 408: The MBMS GW releases a user-plane bearer context and a control-plane bearer context.

Step 409: The MBMS GW sends a session stop response to the edge BM-SC.

After step 409, another step may be further included. For example, the MBMS GW sends a session stop request to a downstream MME, the MME releases a bearer context, and the MME sends a session stop request to another downstream node. Details are not described herein. For details, reference may be made to an existing eMBMS standard procedure.

In this example, the edge BM-SC and the MBMS GW are deployed on the network edge, the central BM-SC is deployed on the core network, the edge BM-SC creates the user-plane bearer context, the central BM-SC creates the control-plane bearer context, and the data of the edge MBMS service is directly forwarded to the UE via the edge BM-SC and the MBMS GW located on the network edge, so that data forwarding is performed only on the network edge and does not extend to the core network. Therefore, a data transmission latency of the edge MBMS service can be reduced, less core network bandwidth is used for data transmission of the edge MBMS service, and a service capacity of an entire network is increased.

Figure 5:
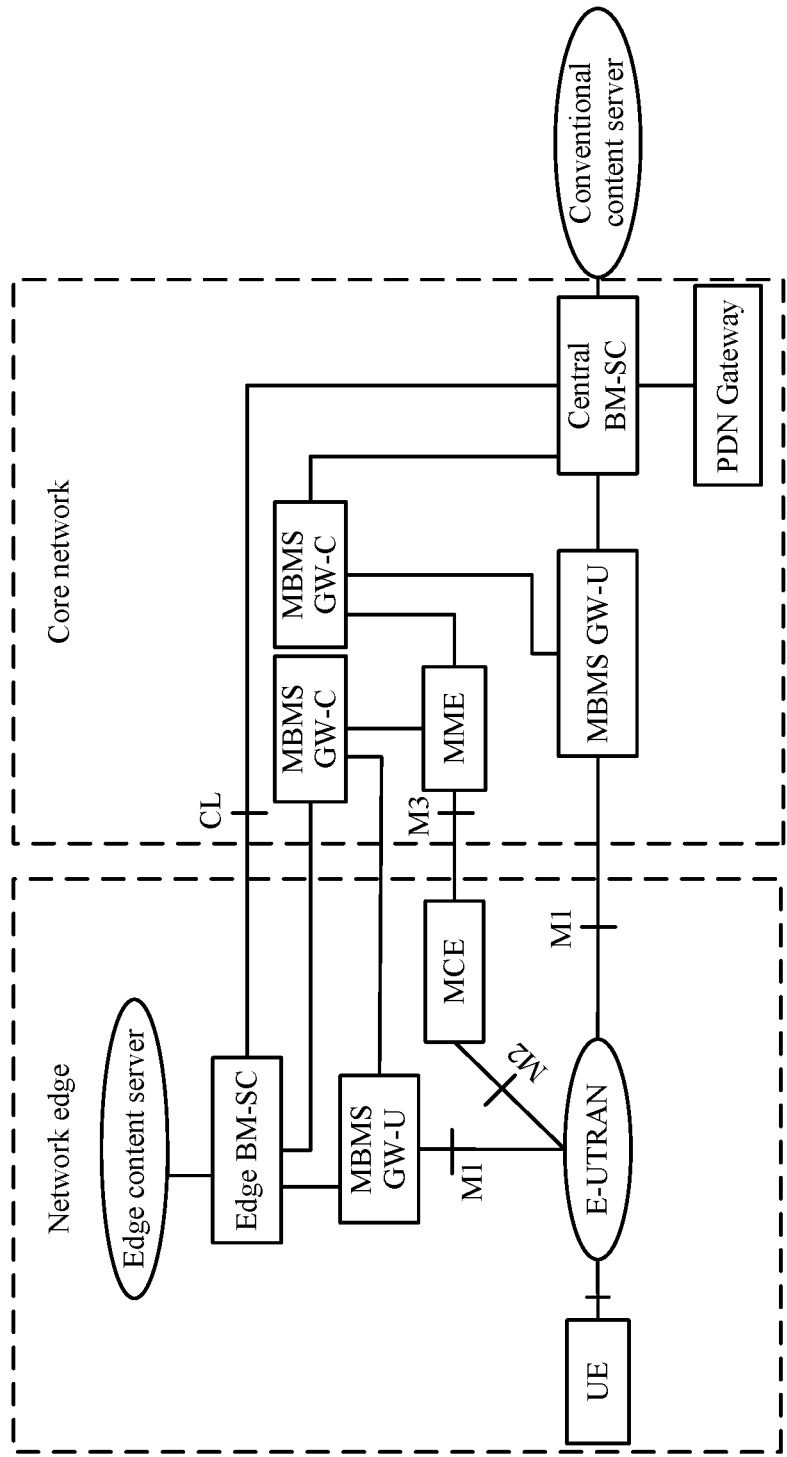
FIG. 5 is a schematic diagram of an MBMS service data transmission system according to another example of the present disclosure.

The following describes a system architecture of the present disclosure in which a control-plane function and a user-plane function of an MBMS GW are implemented on different network entities. Referring to FIG. 5, in an MBMS service data transmission system in this example, an edge BM-SC and an MBMS GW user-plane functional entity (MBMS GW-U) are deployed on a network edge, a central BM-SC and an MBMS GW control-plane functional entity (MBMS GW-C) are deployed on a core network, and the MBMS GW-C is corresponding to the foregoing MBMS GW-U. In addition, an edge content server and an MCE are further deployed on the network edge, UE is located on the network edge, and another MBMS GW-U, an MBMS GW-C corresponding to the another MBMS GW-U, an MME, and the like are further deployed on the core network. The MBMS GW-U is configured to implement the user-plane function of the MBMS GW, and the MBMS GW-C is configured to implement the control-plane function of the MBMS GW. It may be understood that the edge BM-SC implements mainly a user-plane function of a BM-SC. When data of a MBMS service is transmitted, it may be understood that the central BM-SC implements all functions (that is, the user-plane function and a control-plane function) of the BM-SC. When data of an edge MBMS service is transmitted, it may be understood that the central BM-SC implements only the control-plane function of the BM-SC. The edge BM-SC and the central BM-SC may perform signaling and information exchange by adding an interface CL. The edge BM-SC and the MBMS GW-U located on the network edge may perform signaling and information exchange by using an original SGi-mb interface. The edge BM-SC and the MBMS GW-C located on the core network may perform signaling and information exchange by using an original SGmb interface. In addition, for a signaling and information exchange interface between other network elements, reference may be made to provisions in an existing standard, and details are not described herein. That is, in comparison with an MBMS service data transmission system, in the MBMS service data transmission system shown in FIG. 5, the edge BM-SC and the MBMS GW-U are added on the network edge, and the MBMS GW-C corresponding to the MBMS GW-U on the network edge is added on the core network.

Figure 6:
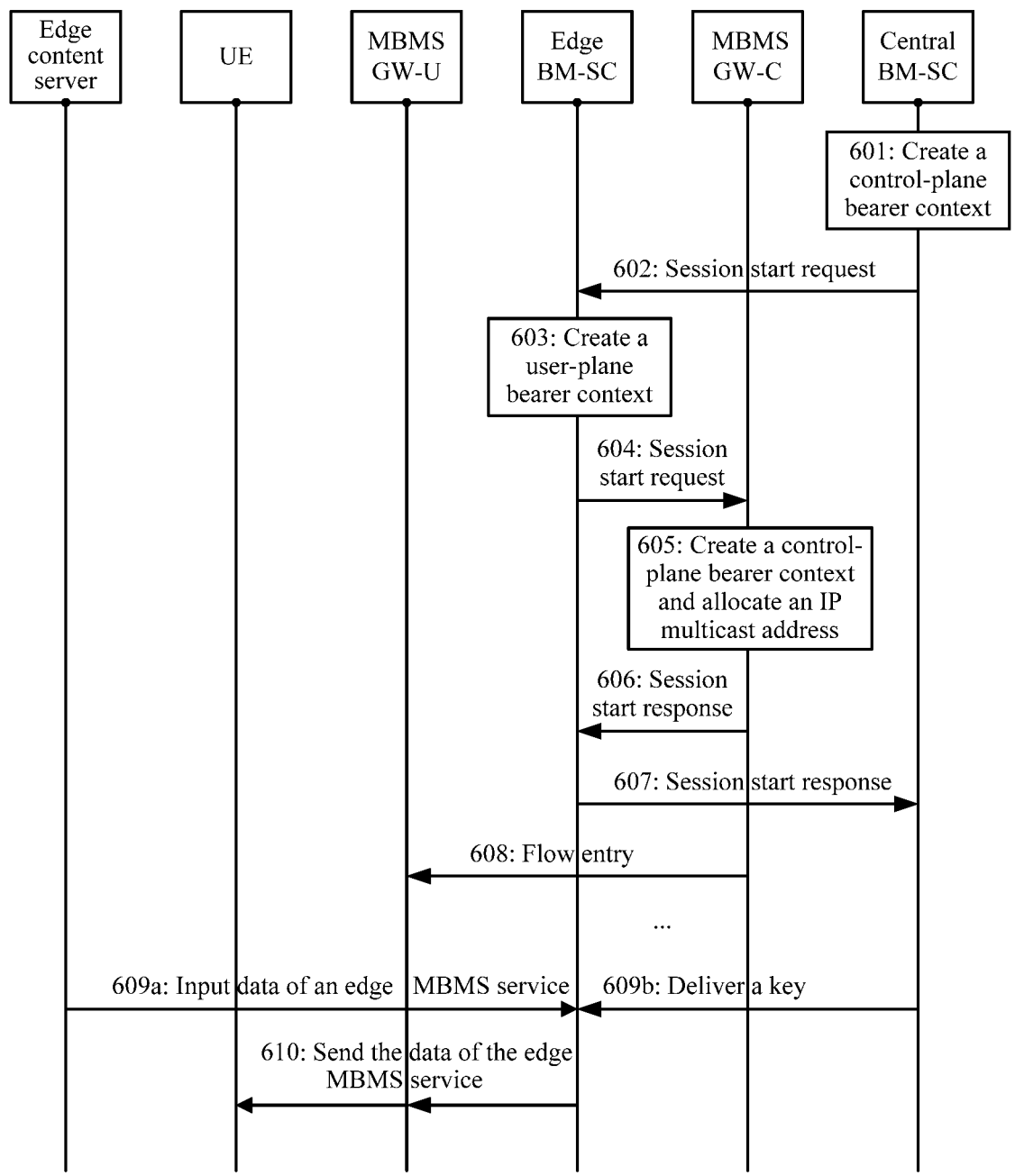
FIG. 6 is a schematic diagram of a session initiation procedure of edge MBMS service data transmission according to another example of the present disclosure.
Figure 7:
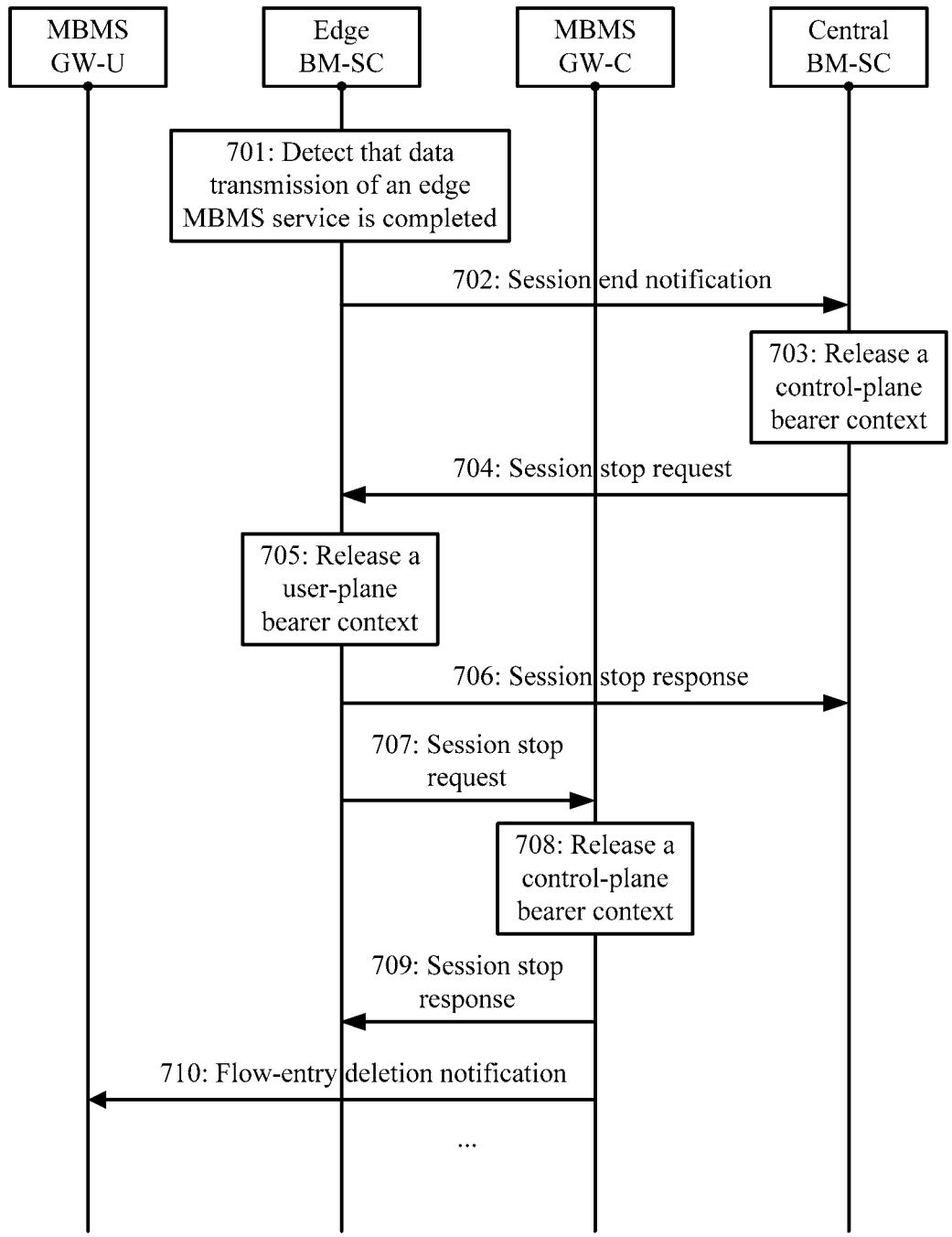
FIG. 7 is a schematic diagram of a session termination procedure of edge MBMS service data transmission according to another example of the present disclosure.

In a system architecture shown in FIG. 5, a transmission path of the data (provided by the edge content server) of the edge MBMS service is as follows: edge BM-SC->MBMS GW-U located on the network edge->E-UTRAN->UE. A transmission path of the data (provided by a content server) of the MBMS service is as follows: central BM-SC->MBMS GW-U located on the core network->E-UTRAN->UE. In the system architecture shown in FIG. 5, for a specific data transmission procedure of the MBMS service, reference may be made to FIG. 1, and details are not described herein. The following example describes mainly a data transmission procedure of the edge MBMS service. Refer to FIG. 6 and FIG. 7. FIG. 6 is a schematic diagram of a session initiation procedure in an edge MBMS service data transmission process according to an example. FIG. 7 is a schematic diagram of a session termination procedure in an edge MBMS service data transmission process according to an example.

Referring to FIG. 6, an MBMS GW-U in FIG. 6 is located on a network edge, a corresponding MBMS GW-C is located on a core network, and the session initiation procedure includes the following steps.

Step 601: A central BM-SC creates a control-plane bearer context for an edge MBMS service.

The control-plane bearer context includes a TMGI that is allocated to the edge MBMS service by the central BM-SC. In addition, the control-plane bearer context may further include information such as QoS, a service area, a session identifier, an address of an edge BM-SC, and a downlink node list. A downlink node is, for example, the MBMS GW-C or an MME.

Step 602: The central BM-SC sends a session start request to an edge BM-SC.

The session start request includes a TMGI of edge data. In addition, the session start request herein may further include an address of the MBMS GW-C, the downlink node list, the service area, the service identifier, the QoS, and the like.

Step 603: The edge BM-SC creates a user-plane bearer context for the edge MBMS service.

Step 604: The edge BM-SC sends a session start request to the MBMS GW-C.

The session start request herein includes the TMGI, the QoS, the service area, the service identifier, an address of a downlink node MME, and the like.

Step 605: The MBMS GW-C allocates an IP multicast address and creates a control-plane bearer context for the edge MBMS service.

Step 606: The MBMS GW-C sends a session start response to the edge BM-SC.

Step 607: The edge BM-SC sends a session start response to the central BM-SC.

Step 608: The MBMS GW-C sends a flow entry to the MBMS GW-U.

The flow entry may be generated by the MBMS GW-C according to the previously allocated IP multicast address.

Before step 608, the following step may be further included: The MBMS GW-C sends a session start request to a downstream MME. Between step 608 and step 609a, the following steps may be further included: The MME creates a bearer context, the MME sends a session start request to another downstream node, and the like. Details are not described herein. For details, reference may be made to an existing eMBMS standard procedure.

Step 609a: An edge content server inputs data of the edge MBMS service into the edge BM-SC.

Step 609b: The central BM-SC delivers a service key to the edge BM-SC.

Step 610: The edge BM-SC sends the data of the edge MBMS service to a UE viathe MBMS GW-U.

The edge BM-SC encrypts the data of the edge MBMS service by using the service key delivered by the central BM-SC and sends encrypted data of the edge MBMS service to the MBMS GW-U. The MBMS GW-U sends, by using an E-UTRAN, the encrypted data to the UE according to the flow entry delivered by the MBMS GW-C.

Referring to FIG. 7, the session termination procedure includes the following steps.

Step 701: An edge BM-SC detects that data transmission of an edge MBMS service is completed.

Step 702: The edge BM-SC sends a session end notification to a central BM-SC.

The session end notification carries a TMGI of the edge MBMS service.

Step 703: The central BM-SC releases a control-plane bearer context.

Step 704: The central BM-SC sends a session stop request to the edge BM-SC.

The session stop request carries the TMGI of the edge MBMS service.

Step 705: The edge BM-SC releases a user-plane bearer context.

Step 706: The edge BM-SC sends a session stop response to the central BM-SC.

The session stop response carries the TMGI of the edge MBMS service.

Step 707: The edge BM-SC sends a session stop request to an MBMS GW-C.

Step 708: The MBMS GW-C releases a control-plane bearer context.

Step 709: The MBMS GW-C sends a session stop response to the edge BM-SC.

Between step 709 and step 710, the following steps may be further included: The MBMS GW-C sends a session stop request to a downstream MME, the MME releases a bearer context, and the like.

Step 710: The MBMS GW-C sends a flow-entry deletion notification to an MBMS GW-U.

After receiving the flow-entry deletion notification, the MBMS GW-U deletes a flow entry delivered by the MBMS GW-C.

After step 710, the following steps may be further included: The MME sends a session stop request to another downlink node, the other downstream node releases a bearer context, and the like. Details are not described herein. For details, reference may be made to an existing eMBMS standard procedure.

In this example, the edge BM-SC and the MBMS GW-U are deployed on the network edge, the central BM-SC and the MBMS GW-C are deployed on the core network, the edge BM-SC creates the user-plane bearer context, the central BM-SC creates the control-plane bearer context, and the data of the edge MBMS service is directly forwarded to the UE via the edge BM-SC and the MBMS GW-U located on the network edge, so that data forwarding is performed only on the network edge and does not extend to the core network. Therefore, a data transmission latency of the edge MBMS service can be reduced, less core network bandwidth is used for data transmission of the edge MBMS service, and a service capacity of an entire network is increased.

Figure 8:
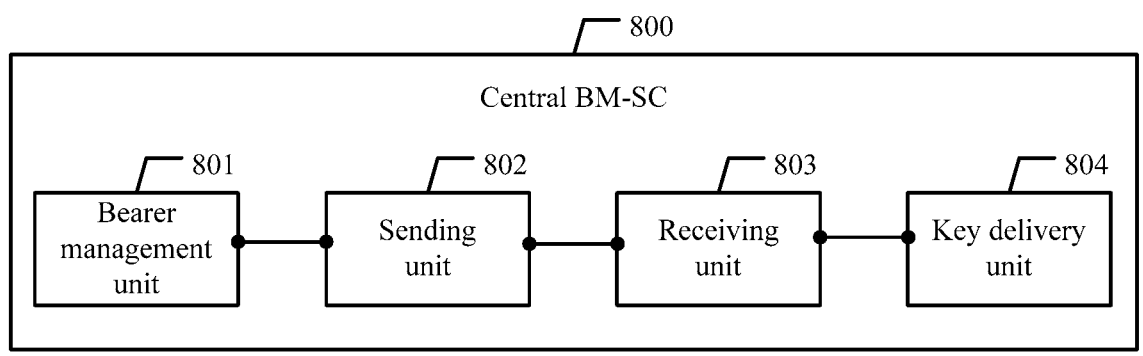
FIG. 8 is a schematic diagram of a central BM-SC according to an example of the present disclosure.

The following describes a central BM-SC provided in the present disclosure. Referring to FIG. 8, the central BM-SC includes a bearer management unit 801, a sending unit 802, a receiving unit 803, and a key delivery unit 804.

In an MBMS service data transmission system shown in FIG. 2, an interaction process between the units in the central BM-SC is as follows.

When data of an edge MBMS service needs to be transmitted to UE, the bearer management unit 801 creates a control-plane bearer context for the edge MBMS service. The control-plane bearer context includes a TMGI that is allocated to the edge MBMS service by the central BM-SC. After the bearer management unit 801 creates the control-plane bearer context, the sending unit 802 sends a session start request to an edge BM-SC located on a network edge, where the session start request carries the TMGI. After the edge BM-SC creates a user-plane bearer context for the edge MBMS service, the receiving unit 803 receives a session start response sent by the edge BM-SC, where the session start response carries the TMGI. Then, the key delivery unit 804 delivers a service key to the edge BM-SC, so that the edge BM-SC encrypts the data of the edge MBMS service by using the service key delivered by the key delivery unit 804 and sends encrypted data of the edge MBMS service to the UE via an MBMS GW located on the network edge.

When detecting that data transmission of the edge MBMS service is completed, the edge BM-SC sends a session end notification to the central BM-SC. The receiving unit 803 receives the session end notification, where the session end notification includes the TMGI. After the receiving unit 803 receives the session end notification, the bearer management unit 801 releases the control-plane bearer context. Then, the sending unit 802 sends a session stop request to the edge BM-SC, where the session stop request includes the TMGI. After the edge BM-SC releases the user-plane bearer context, the receiving unit 803 receives a session stop response sent by the edge BM-SC, where the session stop response includes the TMGI.

In an MBMS service data transmission system shown in FIG. 5, an interaction process between the units in the central BM-SC is as follows.

When data of an edge MBMS service needs to be transmitted to UE, the bearer management unit 801 creates a control-plane bearer context for the edge MBMS service. The control-plane bearer context includes a TMGI that is allocated to the edge MBMS service by the central BM-SC. After the bearer management unit 801 creates the control-plane bearer context, the sending unit 802 sends a session start request to an edge BM-SC located on a network edge, where the session start request carries the TMGI. After the edge BM-SC creates a user-plane bearer context for the edge MBMS service, the receiving unit 803 receives a session start response sent by the edge BM-SC, where the session start response carries the TMGI. Then, the key delivery unit 804 delivers a service key to the edge BM-SC, so that the edge BM-SC encrypts the data of the edge MBMS service by using the service key delivered by the key delivery unit 804 and sends encrypted data of the edge MBMS service to the UE via an MBMS GW-U located on the network edge.

When detecting that data transmission of the edge MBMS service is completed, the edge BM-SC sends a session end notification to the central BM-SC. The receiving unit 803 receives the session end notification, where the session end notification includes the TMGI. After the receiving unit 803 receives the session end notification, the bearer management unit 801 releases the control-plane bearer context. Then, the sending unit 802 sends a session stop request to the edge BM-SC, where the session stop request includes the TMGI. After the edge BM-SC releases the user-plane bearer context, the receiving unit 803 receives a session stop response sent by the edge BM-SC, where the session stop response includes the TMGI.

Figure 9:
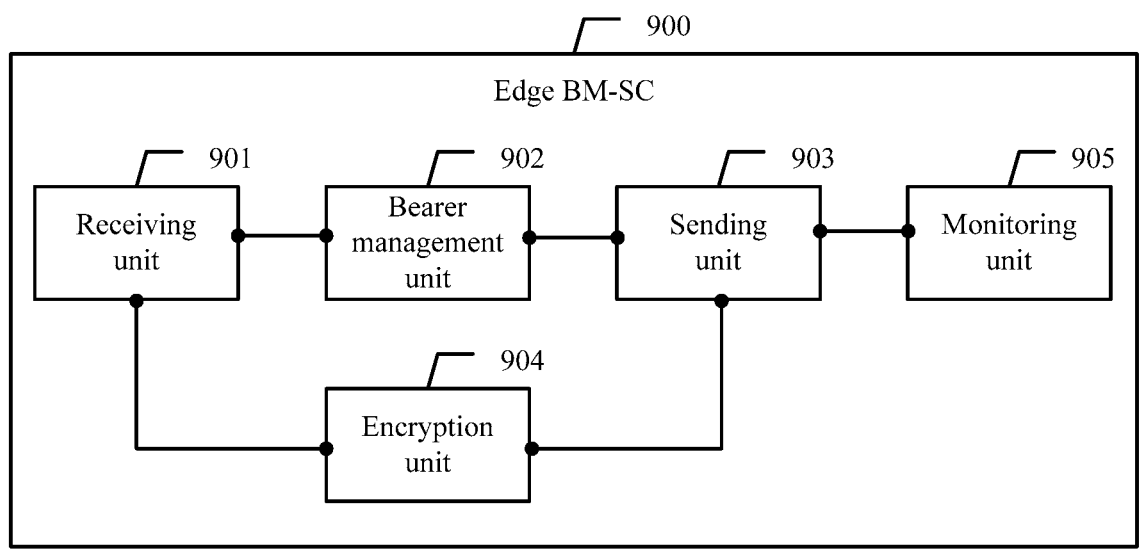
FIG. 9 is a schematic diagram of an edge BM-SC according to an example of the present disclosure.

The following describes an edge BM-SC provided in the present disclosure. Referring to FIG. 9, the edge BM-SC includes a receiving unit 901, a bearer management unit 902, a sending unit 903, an encryption unit 904, and a monitoring unit 905.

In an MBMS service data transmission system shown in FIG. 2, an interaction process between the units in the edge BM-SC is as follows.

When data of an edge MBMS service needs to be transmitted to UE, a central BM-SC creates a control-plane bearer context for the edge MBMS service. The control-plane bearer context includes a TMGI that is allocated to the edge MBMS service by the central BM-SC. The central BM-SC sends a session start request to the edge BM-SC, and the receiving unit 901 receives the session start request, where the session start request carries the TMGI. After the receiving unit 901 receives the session start request, the bearer management unit 902 creates a user-plane bearer context for the edge MBMS service. Then, the sending unit 903 sends a session start request to an MBMS GW located on a network edge. After the MBMS GW allocates an IP multicast address and creates a control-plane bearer context and a user-plane bearer context for the edge MBMS service, the receiving unit 901 receives a session start response sent by the MBMS GW, where the session start response carries the TMGI. The sending unit 903 sends a session start response to the central BM-SC. After receiving the session start response, the central BM-SC allocates a service key and delivers the allocated service key to the edge BM-SC. The receiving unit 901 receives the service key delivered by the central BM-SC. The encryption unit 904 encrypts the data of the edge MBMS service by using the service key received by the receiving unit 901. The sending unit 903 sends encrypted data of the edge MBMS service to the a UE via the MBMS GW, where the MBMS GW sends the encrypted data of the edge MBMS service to the UE according to the previously allocated IP multicast address.

In a data transmission process of the edge MBMS service, the monitoring unit 905 monitors a transmission progress, and the sending unit 903 sends a session end notification to the central BM-SC when the monitoring unit 905 detects that data transmission of the edge MBMS service is completed, where the session end notification includes the TMGI. After receiving the session end notification, the central BM-SC releases the control-plane bearer context and sends a session stop request to the edge BM-SC, where the session stop request includes the TMGI. The receiving unit 901 receives the session stop request. The bearer management unit 902 releases the user-plane bearer context. The sending unit 903 sends a session stop response to the central BM-SC, where the session stop response includes the TMGI. In addition, after the sending unit 903 sends the session stop response to the central BM-SC, the sending unit 903 further sends a session stop request to the MBMS GW. The MBMS GW releases the control-plane bearer context and the user-plane bearer context that are created by the MBMS GW and sends a session stop response to the edge BM-SC. The receiving unit 901 receives the session stop response sent by the MBMS GW.

In an MBMS service data transmission system shown in FIG. 5, an interaction process between the units in the edge BM-SC is as follows.

When data of an edge MBMS service needs to be transmitted to UE, a central BM-SC creates a control-plane bearer context for the edge MBMS service. The control-plane bearer context includes a TMGI that is allocated to the edge MBMS service by the central BM-SC. The central BM-SC sends a session start request to the edge BM-SC, and the receiving unit 901 receives the session start request, where the session start request carries the TMGI. After the receiving unit 901 receives the session start request, the bearer management unit 902 creates a user-plane bearer context for the edge MBMS service. Then, the sending unit 903 sends a session start request to an MBMS GW-C. After the MBMS GW-C allocates an IP multicast address and creates a control-plane bearer context for the edge MBMS service, the receiving unit 901 receives a session start response sent by the MBMS GW-C, where the session start response carries the TMGI. The sending unit 903 sends a session start response to the central BM-SC. After receiving the session start response, the central BM-SC allocates a service key and delivers the allocated service key to the edge BM-SC. The receiving unit 901 receives the service key delivered by the central BM-SC. The encryption unit 904 encrypts the data of the edge MBMS service by using the service key received by the receiving unit 901. The sending unit 903 sends encrypted data of the edge MBMS service to the UE via an MBMS GW-U, where the MBMS GW-U sends the encrypted data of the edge MBMS service to the UE according to a flow entry delivered by the MBMS GW-C, and the flow entry is generated by the MBMS GW-C according to the previously allocated IP multicast address.

In a data transmission process of the edge MBMS service, the monitoring unit 905 monitors a transmission progress, and the sending unit 903 sends a session end notification to the central BM-SC when the monitoring unit 905 detects that data transmission of the edge MBMS service is completed, where the session end notification includes the TMGI. After receiving the session end notification, the central BM-SC releases the control-plane bearer context and sends a session stop request to the edge BM-SC, where the session stop request includes the TMGI. The receiving unit 901 receives the session stop request. The bearer management unit 902 releases the user-plane bearer context. The sending unit 903 sends a session stop response to the central BM-SC, where the session stop response includes the TMGI. In addition, after the sending unit 903 sends the session stop response to the central BM-SC, the sending unit 903 further sends a session stop request to the MBMS GW-C. The MBMS GW-C releases the control-plane bearer context created by the MBMS GW-C and sends a session stop response to the edge BM-SC. The receiving unit 901 receives the session stop response. Then, the MBMS GW-C may further send a flow-entry deletion notification to the MBMS GW-U. After receiving the flow-entry deletion notification, the MBMS GW-U deletes the flow entry delivered by the MBMS GW-C.

Figure 10:
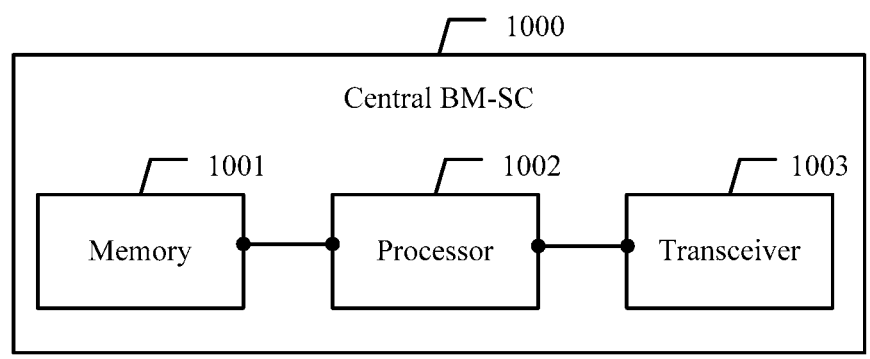
FIG. 10 is a schematic diagram of a central BM-SC according to another example of the present disclosure.

Referring to FIG. 10, in another example of the present disclosure, a central BM-SC includes a memory 1001, a processor 1002, and a transceiver 1003. The processor 1002 executes a software program stored in the memory 1001, to implement the following process:

creating a control-plane bearer context for an edge MBMS service, where the control-plane bearer context includes a TMGI that is allocated to the edge MBMS service by the central BM-SC;

controlling the transceiver 1003 to send a session start request to an edge BM-SC, so that the edge BM-SC creates a user-plane bearer context for the edge MBMS service, where the session start request carries the TMGI;

controlling the transceiver 1003 to receive a session start response sent by the edge BM-SC, where the session start response carries the TMGI; and delivering a service key to the edge BM-SC, so that the edge BM-SC encrypts data of the edge MBMS service by using the service key and sends encrypted data of the edge MBMS service to UE via an MBMS GW.

Alternatively, the processor 1002 executes a software program stored in the memory 1001, to implement the following process:

creating a control-plane bearer context for an edge MBMS service, where the control-plane bearer context includes a TMGI that is allocated to the edge MBMS service by the central BM-SC;

controlling the transceiver 1003 to send a session start request to an edge BM-SC, so that the edge BM-SC creates a user-plane bearer context for the edge MBMS service, where the session start request carries the TMGI;

controlling the transceiver 1003 to receive a session start response sent by the edge BM-SC, where the session start response carries the TMGI; and delivering a service key to the edge BM-SC, so that the edge BM-SC encrypts data of the edge MBMS service by using the service key and sends encrypted data of the edge MBMS service to a UE via an MBMS GW user-plane functional entity.

Figure 11:
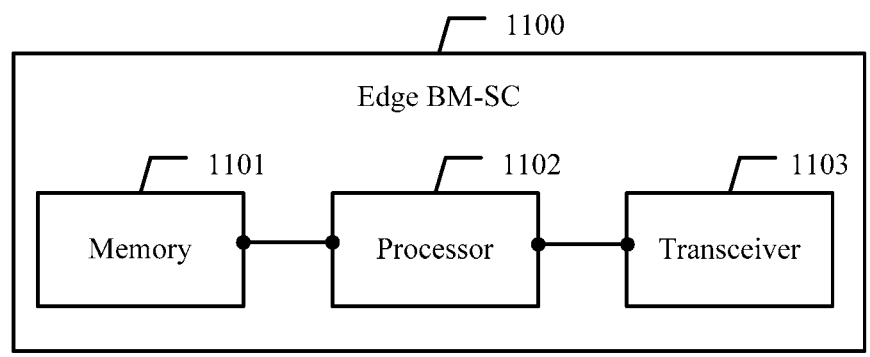
FIG. 11 is a schematic diagram of an edge BM-SC according to another example of the present disclosure.

Referring to FIG. 11, in another example of the present disclosure, an edge BM-SC includes a memory 1101, a processor 1102, and a transceiver 1103. The processor 1102 executes a software program stored in the memory 1101, to implement the following process:

controlling the transceiver 1103 to receive a session start request sent by a central BM-SC, where the session start request carries a TMGI that is of an edge MBMS service and that is included in a control-plane bearer context, and the control-plane bearer context is created for the edge MBMS service by the central BM-SC;

creating a user-plane bearer context for the edge MBMS service; controlling the transceiver 1103 to send a session start request to an MBMS GW, so that the MBMS GW allocates an IP multicast address and creates a control-plane bearer context and a user-plane bearer context for the edge MBMS service;

controlling the transceiver 1103 to receive a session start response sent by the MBMS GW, where the session start response carries the TMGI;

controlling the transceiver 1103 to send a session start response to the central BM-SC;

controlling the transceiver 1103 to receive a service key delivered by the central BM-SC; and encrypting data of the edge MBMS service by using the service key, and controlling the transceiver 1103 to send encrypted data of the edge MBMS service to a UE via the MBMS GW, where the MBMS GW sends the encrypted data of the edge MBMS service to the UE according to the IP multicast address.

Alternatively, the processor 1102 executes a software program stored in the memory 1101, to implement the following process:

controlling the transceiver 1103 to receive a session start request sent by a central BM-SC, where the session start request carries a TMGI that is of an edge MBMS service and that is included in a control-plane bearer context, and the control-plane bearer context is created for the edge MBMS service by the central BM-SC;

creating a user-plane bearer context for the edge MBMS service;

controlling the transceiver 1103 to send a session start request to an MBMS GW control-plane functional entity, so that the MBMS GW control-plane functional entity allocates an IP multicast address and creates a control-plane bearer context for the edge MBMS service;

controlling the transceiver 1103 to receive a session start response sent by the MBMS GW control-plane functional entity, where the session start response carries the TMGI;

controlling the transceiver 1103 to send a session start response to the central BM-SC;

controlling the transceiver 1103 to receive a service key delivered by the central BM-SC; and encrypting data of the edge MBMS service by using the service key, and controlling the transceiver 1103 to send encrypted data of the edge MBMS service to a UE via an MBMS GW user-plane functional entity, where the MBMS GW user-plane functional entity sends the encrypted data of the edge MBMS service to the UE according to a flow entry delivered by the MBMS GW control-plane functional entity, and the flow entry is generated by the MBMS GW control-plane functional entity according to the IP multicast address.

The present disclosure provides a data transmission method for an edge MBMS service and a related device, so that a data transmission latency of the edge MBMS service can be reduced, less core network bandwidth is used for data transmission of the edge MBMS service, and a service capacity of an entire network is increased.

According to a first aspect, an example of the present disclosure provides a data transmission method for an edge MBMS service, where the data transmission method for the edge MBMS service is applied to an MBMS service data transmission system, the MBMS service data transmission system includes a central broadcast/multicast service center BM-SC located on a core network and an edge BM-SC and an edge multimedia broadcast/multicast service gateway MBMS GW that are located on a network edge, and the data transmission method for the edge MBMS service includes:

creating, by the central BM-SC, a control-plane bearer context for the edge MBMS service, where the control-plane bearer context includes a temporary mobile group identity TMGI that is allocated to the edge MBMS service by the central BM-SC;

sending, by the central BM-SC, a session start request to the edge BM-SC, so that the edge BM-SC creates a user-plane bearer context for the edge MBMS service, where the session start request carries the TMGI;

receiving, by the central BM-SC, a session start response sent by the edge BM-SC, where the session start response carries the TMGI; and delivering, by the central BM-SC, a service key to the edge BM-SC, so that the edge BM-SC encrypts data of the edge MBMS service by using the service key and sends encrypted data of the edge MBMS service to a user equipment UE via the MBMS GW.

With reference to the first aspect, in a first implementation of the first aspect, the method further includes:

receiving, by the central BM-SC, a session end notification sent by the edge BM-SC, where the session end notification includes the TMGI;

releasing, by the central BM-SC, the control-plane bearer context, and sending a session stop request to the edge BM-SC, so that the edge BM-SC releases the user-plane bearer context, where the session stop request includes the TMGI; and receiving, by the central BM-SC, a session stop response sent by the edge BM-SC, where the session stop response includes the TMGI.

According to a second aspect, an example of the present disclosure provides a data transmission method for an edge MBMS service, where the data transmission method for the edge MBMS service is applied to an MBMS service data transmission system, the MBMS service data transmission system includes a central broadcast/multicast service center BM-SC located on a core network and an edge BM-SC and an edge multimedia broadcast/multicast service gateway MBMS GW that are located on a network edge, and the data transmission method for the edge MBMS service includes:

receiving, by the edge BM-SC, a session start request sent by the central BM-SC, where the session start request carries a temporary mobile group identity TMGI that is of the edge MBMS service and that is included in a control-plane bearer context, and the control-plane bearer context is created for the edge MBMS service by the central BM-SC;

creating, by the edge BM-SC, a user-plane bearer context for the edge MBMS service;

sending, by the edge BM-SC, the session start request to the MBMS GW, so that the MBMS GW allocates an Internet Protocol IP multicast address and creates a control-plane bearer context and a user-plane bearer context for the edge MBMS service;

receiving, by the edge BM-SC, a session start response sent by the MBMS GW, where the session start response carries the TMGI;

sending, by the edge BM-SC, the session start response to the central BM-SC;

receiving, by the edge BM-SC, a service key delivered by the central BM-SC; and encrypting, by the edge BM-SC, data of the edge MBMS service by using the service key, and sending encrypted data of the edge MBMS service to a user equipment UE via the MBMS GW, where the MBMS GW sends the encrypted data of the edge MBMS service to the UE according to the IP multicast address.

With reference to the second aspect, in a first implementation of the second aspect, the method further includes:

monitoring, by the edge BM-SC, a data transmission progress of the edge MBMS service;

sending, by the edge BM-SC, a session end notification to the central BM-SC when detecting that data transmission of the MBMS service ends, so that the central BM-SC releases the control-plane bearer context created by the central BM-SC, where the session end notification includes the TMGI;

receiving, by the edge BM-SC, a session stop request sent by the central BM-SC, where the session stop request includes the TMGI;

releasing, by the edge BM-SC, the user-plane bearer context created by the edge BM-SC; and sending, by the edge BM-SC, a session stop response to the central BM-SC, where the session stop response carries the TMGI.

With reference to the first implementation of the second aspect, in a second implementation of the second aspect, the method further includes:

sending, by the edge BM-SC, the session stop request to the MBMS GW, so that the MBMS GW releases the control-plane bearer context and the user-plane bearer context that are created by the MBMS GW; and receiving, by the edge BM-SC, the session stop response sent by the MBMS GW.

According to a third aspect, an example of the present disclosure provides a data transmission method for an edge MBMS service, where the data transmission method for the edge MBMS service is applied to an MBMS service data transmission system, the MBMS service data transmission system includes a central broadcast/multicast service center BM-SC located on a core network and an edge BM-SC and an edge multimedia broadcast/multicast service gateway MBMS GW user-plane functional entity that are located on a network edge, and the data transmission method for the edge MBMS service includes:

creating, by the central BM-SC, a control-plane bearer context for the edge MBMS service, where the control-plane bearer context includes a temporary mobile group identity TMGI that is allocated to the edge MBMS service by the central BM-SC;

sending, by the central BM-SC, a session start request to the edge BM-SC, so that the edge BM-SC creates a user-plane bearer context for the edge MBMS service, where the session start request carries the TMGI;

receiving, by the central BM-SC, a session start response sent by the edge BM-SC, where the session start response carries the TMGI; and delivering, by the central BM-SC, a service key to the edge BM-SC, so that the edge BM-SC encrypts data of the edge MBMS service by using the service key and sends encrypted data of the edge MBMS service to a user equipment UE via the MBMS GW user-plane functional entity.

With reference to the third aspect, in a first implementation of the third aspect, the method further includes:

receiving, by the central BM-SC, a session end notification sent by the edge BM-SC, where the session end notification includes the TMGI;

releasing, by the central BM-SC, the control-plane bearer context, and sending a session stop request to the edge BM-SC, so that the edge BM-SC releases the user-plane bearer context, where the session stop request includes the TMGI; and receiving, by the central BM-SC, a session stop response sent by the edge BM-SC, where the session stop response includes the TMGI.

According to a fourth aspect, an example of the present disclosure provides a data transmission method for an edge MBMS service, where the data transmission method for the edge MBMS service is applied to an MBMS service data transmission system, the MBMS service data transmission system includes a central broadcast/multicast service center BM-SC and a multimedia broadcast/multicast service gateway MBMS GW control-plane functional entity that are located on a core network and an edge BM-SC and an MBMS GW user-plane functional entity that are located on a network edge, the MBMS GW user-plane functional entity is corresponding to the MBMS GW control-plane functional entity, and the data transmission method for the edge MBMS service includes:

receiving, by the edge BM-SC, a session start request sent by the central BM-SC, where the session start request carries a temporary mobile group identity TMGI that is of the edge MBMS service and that is included in a control-plane bearer context, and the control-plane bearer context is created for the edge MBMS service by the central BM-SC;

creating, by the edge BM-SC, a user-plane bearer context for the edge MBMS service;

sending, by the edge BM-SC, the session start request to the MBMS GW control-plane functional entity, so that the MBMS GW control-plane functional entity allocates an Internet Protocol IP multicast address and creates a control-plane bearer context for the edge MBMS service;

receiving, by the edge BM-SC, a session start response sent by the MBMS GW control-plane functional entity, where the session start response carries the TMGI;

sending, by the edge BM-SC, the session start response to the central BM-SC;

receiving, by the edge BM-SC, a service key delivered by the central BM-SC; and encrypting, by the edge BM-SC, data of the edge MBMS service by using the service key, and sending encrypted data of the edge MBMS service to s user equipment UE via the MBMS GW user-plane functional entity, where the MBMS GW user-plane functional entity sends the encrypted data of the edge MBMS service to the UE according to a flow entry delivered by the MBMS GW control-plane functional entity, and the flow entry is generated by the MBMS GW control-plane functional entity according to the IP multicast address.

With reference to the fourth aspect, in a first implementation of the fourth aspect, the method further includes:

monitoring, by the edge BM-SC, a data transmission progress of the edge MBMS service;

sending, by the edge BM-SC, a session end notification to the central BM-SC when detecting that data transmission of the MBMS service ends, so that the central BM-SC releases the control-plane bearer context created by the central BM-SC, where the session end notification includes the TMGI;

receiving, by the edge BM-SC, a session stop request sent by the central BM-SC, where the session stop request includes the TMGI;

releasing, by the edge BM-SC, the user-plane bearer context created by the edge BM-SC; and sending, by the edge BM-SC, a session stop response to the central BM-SC, where the session stop response carries the TMGI.

With reference to the first implementation of the fourth aspect, in a second implementation of the fourth aspect, the method further includes:

sending, by the edge BM-SC, the session stop request to the MBMS GW control-plane functional entity, so that the MBMS GW control-plane functional entity releases the control-plane bearer context created by the control-plane MBMS GW; and receiving, by the edge BM-SC, the session stop response sent by the MBMS GW control-plane functional entity.

According to a fifth aspect, an example of the present disclosure provides a central BM-SC, where the central BM-SC is located on a core network, and the central BM-SC includes:

a bearer management unit, configured to create a control-plane bearer context for an edge multimedia broadcast/multicast service MBMS service, where the control-plane bearer context includes a temporary mobile group identity TMGI that is allocated to the edge MBMS service by the central BM-SC;

a sending unit, configured to send a session start request to an edge BM-SC located on a network edge, so that the edge BM-SC creates a user-plane bearer context for the edge MBMS service, where the session start request carries the TMGI;

a receiving unit, configured to receive a session start response sent by the edge BM-SC, where the session start response carries the TMGI; and a key delivery unit, configured to deliver a service key to the edge BM-SC, so that the edge BM-SC encrypts data of the edge MBMS service by using the service key and sends encrypted data of the edge MBMS service to a user equipment UE via an edge multimedia broadcast/multicast service gateway MBMS GW located on the network edge.

With reference to the fifth aspect, in a first implementation of the fifth aspect, the receiving unit is further configured to receive a session end notification sent by the edge BM-SC, where the session end notification includes the TMGI;

the bearer management unit is further configured to release the control-plane bearer context;

the sending unit is further configured to send a session stop request to the edge BM-SC, so that the edge BM-SC releases the user-plane bearer context, where the session stop request includes the TMGI; and the receiving unit is further configured to receive a session stop response sent by the edge BM-SC, where the session stop response includes the TMGI.

According to a sixth aspect, an example of the present disclosure provides an edge BM-SC, where the edge BM-SC is located on a network edge, and the edge BM-SC includes:

a receiving unit, configured to receive a session start request sent by a central BM-SC located on a core network, where the session start request carries a temporary mobile group identity TMGI that is of an edge multimedia broadcast/multicast service MBMS service and that is included in a control-plane bearer context, and the control-plane bearer context is created for the edge MBMS service by the central BM-SC;

a bearer management unit, configured to create a user-plane bearer context for the edge MBMS service; and a sending unit, configured to send the session start request to a multimedia broadcast/multicast service gateway MBMS GW located on the network edge, so that the MBMS GW allocates an Internet Protocol IP multicast address and creates a control-plane bearer context and a user-plane bearer context for the edge MBMS service, where the receiving unit is further configured to receive a session start response sent by the MBMS GW, where the session start response carries the TMGI;

the sending unit is further configured to send the session start response to the central BM-SC;

the receiving unit is further configured to receive a service key delivered by the central BM-SC;

the edge BM-SC further includes an encryption unit, where the encryption unit is configured to encrypt data of the edge MBMS service by using the service key; and the sending unit is further configured to send encrypted data of the edge MBMS service to a user equipment UE via the MBMS GW, where the MBMS GW sends the encrypted data of the edge MBMS service to the UE according to the IP multicast address.

With reference to the sixth aspect, in a first implementation of the sixth aspect, the edge BM-SC further includes:

a monitoring unit, configured to monitor a data transmission progress of the edge MBMS service, where the sending unit is further configured to send a session end notification to the central BM-SC when the monitoring unit detects that data transmission of the MBMS service ends, so that the central BM-SC releases the control-plane bearer context created by the central BM-SC, where the session end notification includes the TMGI;

the receiving unit is further configured to receive a session stop request sent by the central BM-SC, where the session stop request includes the TMGI;

the bearer management unit is further configured to release the user-plane bearer context created by the edge BM-SC; and the sending unit is further configured to send a session stop response to the central BM-SC, where the session stop response carries the TMGI.

With reference to the first implementation of the sixth aspect, in a second implementation of the sixth aspect, the sending unit is further configured to send the session stop request to the MBMS GW, so that the MBMS GW releases the control-plane bearer context and the user-plane bearer context that are created by the MBMS GW; and the receiving unit is further configured to receive the session stop response sent by the MBMS GW.

According to a seventh aspect, an example of the present disclosure provides a central BM-SC, where the central BM-SC is located on a core network, and the central BM-SC includes:

a bearer management unit, configured to create a control-plane bearer context for an edge multimedia broadcast/multicast service MBMS service, where the control-plane bearer context includes a temporary mobile group identity TMGI that is allocated to the edge MBMS service by the central BM-SC;

a sending unit, configured to send a session start request to an edge BM-SC located on a network edge, so that the edge BM-SC creates a user-plane bearer context for the edge MBMS service, where the session start request carries the TMGI;

a receiving unit, configured to receive a session start response sent by the edge BM-SC, where the session start response carries the TMGI; and a key delivery unit, configured to deliver a service key to the edge BM-SC, so that the edge BM-SC encrypts data of the edge MBMS service by using the service key and sends encrypted data of the edge MBMS service to a user equipment UE via a multimedia broadcast/multicast service gateway MBMS GW user-plane functional entity located on the network edge.

With reference to the seventh aspect, in a first implementation of the seventh aspect, the receiving unit is further configured to receive a session end notification sent by the edge BM-SC, where the session end notification includes the TMGI;

the bearer management unit is further configured to release the control-plane bearer context;

the sending unit is further configured to send a session stop request to the edge BM-SC, so that the edge BM-SC releases the user-plane bearer context, where the session stop request includes the TMGI; and the receiving unit is further configured to receive a session stop response sent by the edge BM-SC, where the session stop response includes the TMGI.

According to an eighth aspect, an example of the present disclosure provides an edge BM-SC, where the edge BM-SC is located on a network edge, and the edge BM-SC includes:

a receiving unit, configured to receive a session start request sent by a central BM-SC located on a core network, where the session start request carries a temporary mobile group identity TMGI that is of an edge multimedia broadcast/multicast service MBMS service and that is included in a control-plane bearer context, and the control-plane bearer context is created for the edge MBMS service by the central BM-SC;

a bearer management unit, configured to create a user-plane bearer context for the edge MBMS service; and a sending unit, configured to send the session start request to an edge multimedia broadcast/multicast service gateway MBMS GW control-plane functional entity located on the core network, so that the MBMS GW control-plane functional entity allocates an Internet Protocol IP multicast address and creates a control-plane bearer context for the edge MBMS service, where the receiving unit is further configured to receive a session start response sent by the MBMS GW control-plane functional entity, where the session start response carries the TMGI;

the sending unit is further configured to send the session start response to the central BM-SC;

the receiving unit is further configured to receive a service key delivered by the central BM-SC;

the edge BM-SC further includes an encryption unit, where the encryption unit is configured to encrypt data of the edge MBMS service by using the service key; and the sending unit is further configured to send encrypted data of the edge MBMS service to a user equipment UE via an MBMS GW user-plane functional entity located on the network edge, where the MBMS GW user-plane functional entity sends the encrypted data of the edge MBMS service to the UE according to a flow entry delivered by the MBMS GW control-plane functional entity, and the flow entry is generated by the MBMS GW control-plane functional entity according to the IP multicast address.

With reference to the eighth aspect, in a first implementation of the eighth aspect, the edge BM-SC further includes:

a monitoring unit, configured to monitor a data transmission progress of the edge MBMS service, where the sending unit is further configured to send a session end notification to the central BM-SC when the monitoring unit detects that data transmission of the MBMS service ends, so that the central BM-SC releases the control-plane bearer context created by the central BM-SC, where the session end notification includes the TMGI;

the receiving unit is further configured to receive a session stop request sent by the central BM-SC, where the session stop request includes the TMGI;

the bearer management unit is further configured to release the user-plane bearer context created by the edge BM-SC; and the sending unit is further configured to send a session stop response to the central BM-SC, where the session stop response carries the TMGI.

With reference to the first implementation of the eighth aspect, in a second implementation of the eighth aspect, the sending unit is further configured to send the session stop request to the MBMS GW control-plane functional entity, so that the MBMS GW control-plane functional entity releases the control-plane bearer context created by the control-plane MBMS GW; and the receiving unit is further configured to receive the session stop response sent by the MBMS GW control-plane functional entity.

It can be learned from the foregoing technical solutions that examples of the present disclosure have the following advantages:

In the examples of the present disclosure, the edge BM-SC and the MBMS GW are deployed on the network edge, the central BM-SC is deployed on the core network, the edge BM-SC creates the user-plane bearer context, the central BM-SC creates the control-plane bearer context, and the data of the edge MBMS service is directly forwarded to the UE via the edge BM-SC and the MBMS GW on the network edge, so that data forwarding is performed only on the network edge and does not extend to the core network. Therefore, a data transmission latency of the edge MBMS service can be reduced, less core network bandwidth is used for data transmission of the edge MBMS service, and a service capacity of an entire network is increased.

For brief description, for a process that is not described in detail in the apparatus examples of the present disclosure, reference may be made to the description in the corresponding method examples.

In addition, it should be noted that, the apparatus examples described above are merely examples. The units described as separate parts may or may not be physically separated. Some or all of the modules may be selected according to actual needs to achieve the objectives of the solutions of the examples. In addition, in the accompanying drawings of the apparatus examples provided in the present disclosure, connection relationships between modules indicate that the modules have communication connections to each other, which may be specifically implemented as one or more communications buses or signal cables. A person of ordinary skill in the art may understand and implement the examples of the present disclosure without creative efforts.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit,"

or "sub-unit" may include memory (shared, dedicated, or group) that stores code or instructions that can be executed by one or more processors.

Based on the description of the foregoing implementations, a person skilled in the art may clearly understand that the present disclosure may be implemented by software in addition to necessary general-purpose hardware, or by dedicated hardware, including a dedicated integrated circuit, a dedicated CPU, a dedicated memory, a dedicated component, and the like. Generally, any functions that are performed by a computer program can be easily implemented by using corresponding hardware. Moreover, a specific hardware structure used to achieve a same function may be in various forms, for example, in a form of an analog circuit, a digital circuit, or a dedicated circuit. However, for the present disclosure, an implementation by using a software program is a better implementation in most cases. Based on such an understanding, the technical solutions of the present disclosure may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the examples of the present disclosure.

The data transmission method for the edge MBMS service and the related device that are provided in the examples of the present disclosure are described in detail above. According to an idea of the examples of the present disclosure, a person of ordinary skill in the art may make modifications and variations to the specific implementations and application scope. Therefore, content of the specification shall not be construed as a limitation on the present disclosure.

What is claimed is:

1. A data transmission method for an edge multimedia broadcast/multicast service (edge MBMS) service, the method comprising:
    receiving, by an edge broadcast/multicast service center (edge BM-SC), a session start request from a central broadcast/multicast service center (central BM-SC), wherein the session start request comprises a temporary mobile group identity (TMGI) of the edge MBMS service, wherein the central BM-SC and an MBMS gateway (MBMS GW) control-plane functional entity are located on a core network, wherein the edge BM-SC and an MBMS gateway (MBMS GW) user-plane functional entity are located on a network edge, and wherein the MBMS GW user-plane functional entity corresponds to the MBMS GW control-plane functional entity;
    creating, by the edge BM-SC, a user-plane bearer context for the edge MBMS service in response to the session start request;
    sending, by the edge BM-SC, the session start request comprising the TMGI to the MBMS GW control-plane functional entity, wherein the session start request is used for requesting allocation of an Internet Protocol (IP) multicast address and creation of a control-plane bearer context for the edge MBMS service;
    receiving, by the edge BM-SC, a session start response from the MBMS GW control-plane functional entity, wherein the session start response comprises the TMGI;
    sending, by the edge BM-SC, the session start response to the central BM-SC;
    receiving, by the edge BM-SC, data of the edge MBMS service from a content server located on the network edge;
    receiving, by the edge BM-SC, a service key delivered by the central BM-SC;
    encrypting, by the edge BM-SC, the data of the edge MBMS service by using the service key to generate encrypted data; and
    sending, by the edge BM-SC, the encrypted data of the edge MBMS service to a user equipment (UE) via the MBMS GW user-plane functional entity in accordance with the IP multicast address allocated by the MBMS GW control-plane functional entity.

2. The method according to claim 1, further comprising:
    monitoring, by the edge BM-SC, a data transmission progress of the edge MBMS service;
    sending, by the edge BM-SC, a session end notification to the central BM-SC in response to detecting that data transmission of the edge MBMS service ends, wherein the session end notification is used for requesting release of the control-plane bearer context created by the central BM-SC, wherein the session end notification comprises the TMGI;
    receiving, by the edge BM-SC, a session stop request from the central BM-SC, wherein the session stop request comprises the TMGI;
    releasing, by the edge BM-SC in response to the session stop request, the user-plane bearer context created by the edge BM-SC; and
    sending, by the edge BM-SC, a session stop response to the central BM-SC, wherein the session stop response comprises the TMGI.

3. The method according to claim 2, further comprising:
    sending, by the edge BM-SC, the session stop request to the MBMS GW control-plane functional entity, wherein the session stop request is used for requesting release of the control-plane bearer context created by the MBMS GW control-plane functional entity.

4. The method according to claim 1, wherein a flow entry is generated by the MBMS GW control-plane functional entity according to the IP multicast address and delivered to the MBMS GW user-plane functional entity.

5. The method according to claim 1, wherein the MBMS GW user-plane functional entity receives the encrypted data from the edge BM-SC and transmits the encrypted data to the UE according to the flow entry.

6. A communications system for an edge multimedia broadcast/multicast service (edge MBMS) service, comprising:
    a central broadcast/multicast service center (central BM-SC) located on a core network, wherein the central BM-SC is configured to:
        allocate a temporary mobile group identity (TMGI) to the edge MBMS service;
        create a control-plane bearer context for the edge MBMS service, wherein the control-plane bearer context comprises the TMGI;
        transmit a session start request comprising the TMGI; and
        generate a service key; and
    an edge broadcast/multicast service center (edge BM-SC) located on a network edge, communicatively coupled to the central BM-SC, wherein the edge BM-SC is configured to:

receive the session start request from the central BM-SC;

in response to the session start request, create a user-plane bearer context for the edge MBMS service;

send the session start request comprising the TMGI to an MBMS gateway (MBMS GW) control-plane functional entity;

receive a session start response from the MBMS GW control-plane functional entity, wherein the session start response comprises the TMGI;

receive data of the edge MBMS service from a content server located on the network edge;

receive the service key delivered by the central BM-SC;

encrypt the data of the edge MBMS service by using the service key to generate encrypted data; and transmit the encrypted data of the edge MBMS service to a user equipment (UE).

7. The communications system according to claim 6, further comprising:

an MBMS gateway (MBMS GW) user-plane functional entity located on the network edge;

wherein the edge BM-SC is configured to transmit the encrypted data to the UE via the MBMS GW user-plane functional entity.

8. The communications system according to claim 7, wherein the MBMS GW control-plane functional entity is located on the core network, wherein the MBMS GW control-plane functional entity corresponds the MBMS GW user-plane functional entity; and-wherein the MBMS GW control-plane functional entity is configured to receive the session start request and allocate an Internet Protocol (IP) multicast address and create a control-plane bearer context for the edge MBMS service in response to the session start request.

9. The communications system according to claim 8, wherein:

the edge BM-SC is further configured transmit the session start response to the central BM-SC.

10. The communications system according to claim 8, wherein the MBMS GW control-plane functional entity is further configured to generate a flow entry according to the IP multicast address and deliver the flow entry to the MBMS GW user-plane functional entity.

11. The communications system according to claim 10, wherein the MBMS GW user-plane functional entity is configured to receive the encrypted data from the edge BM-SC, and transmit the encrypted data to the UE according to the flow entry.

12. The communications system according to claim 8, wherein the edge BM-SC is further configured to:

monitor a data transmission progress of the edge MBMS service; and send a session end notification comprising the TMGI to the central BM-SC in response to detecting that data transmission of the edge MBMS service ends.

13. The communications system according to claim 12, wherein:

the central BM-SC is further configured to:

receive the session end notification from the edge BM-SC;

release, in response to the session end notification, the control-plane bearer context; and send a session stop request comprising the TMGI to the edge BM-SC; and the edge BM-SC is further configured to:

receive the session stop request; and release, in response to the session stop request, the user-plane bearer context created by the edge BM-SC.

14. The communications system according to claim 13, wherein:

the edge BM-SC is further configured to transmit the session stop request to the MBMS GW control-plane functional entity; and the MBMS GW control-plane functional entity is further configured to release, in response to the session stop request, the control-plane bearer context created by the MBMS GW control-plane functional entity.

* * * * *